Dec. 18, 1923.  
F. O. GRAY  
AUTOMOBILE DIRECTION INDICATOR  
Filed May 8, 1920  
2 Sheets-Sheet 1

WITNESSES

INVENTOR
F. O. Gray,
BY
ATTORNEYS

Dec. 18, 1923.                                          1,478,007
F. O. GRAY
AUTOMOBILE DIRECTION INDICATOR
Filed May 8, 1920            2 Sheets-Sheet 2
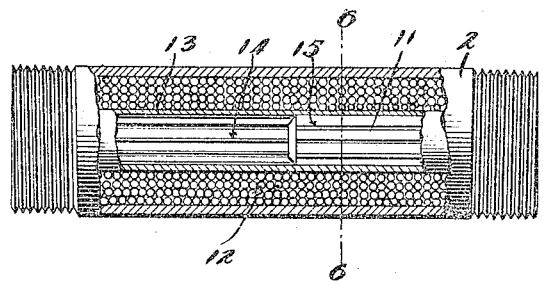
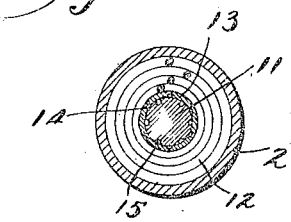
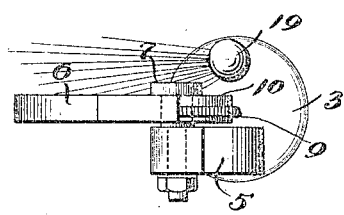
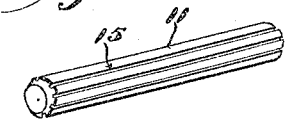
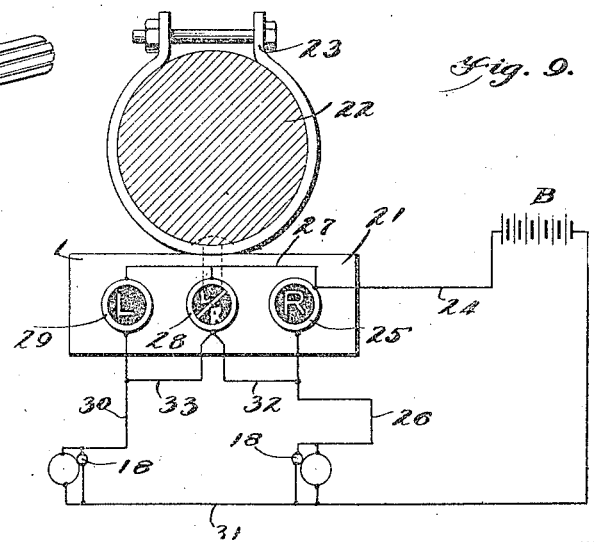
INVENTOR
F. O. Gray,
BY
ATTORNEYS
WITNESSES Patented Dec. 18, 1923.

1,478,007

UNITED STATES PATENT OFFICE.

FRANK OLIVER GRAY, OF HARVARD, ILLINOIS.

AUTOMOBILE DIRECTION INDICATOR.

Application filed May 3, 1920. Serial No. 379,814.

*To all whom it may concern:*

Be it known that I, FRANK OLIVER GRAY, a citizen of the United States, and a resident of Harvard, in the county of McHenry and State of Illinois, have invented certain new and useful Improvements in Automobile Direction Indicators, of which the following is a specification.

My invention relates to improvements in indicators, it being more particularly an improvement in automobile direction indicators, and it consists in the constructions, combinations and arrangements herein described and claimed.

One of the foremost objects of the invention is to provide a signal for apprising the driver of a vehicle in the rear of the one on which the signal is mounted, of the direction which is intended to be followed, without necessitating the operator thrusting his hand out, as is the customary practice.

A further object of the invention is to provide a solenoidally operated signal for automobiles, trucks, and the like, in which the signal arm is illuminated simultaneously upon reaching an extended position.

A further object of the invention is to provide a solenoidally operated direction indicator, in which the signal arm is made of non-magnetic material to avoid obstruction of the operation thereof by the magnetic influence of the solenoid.

Other objects and advantages will appear in the following specification, reference being had to the accompanying drawings, in which:—

Figure 1:
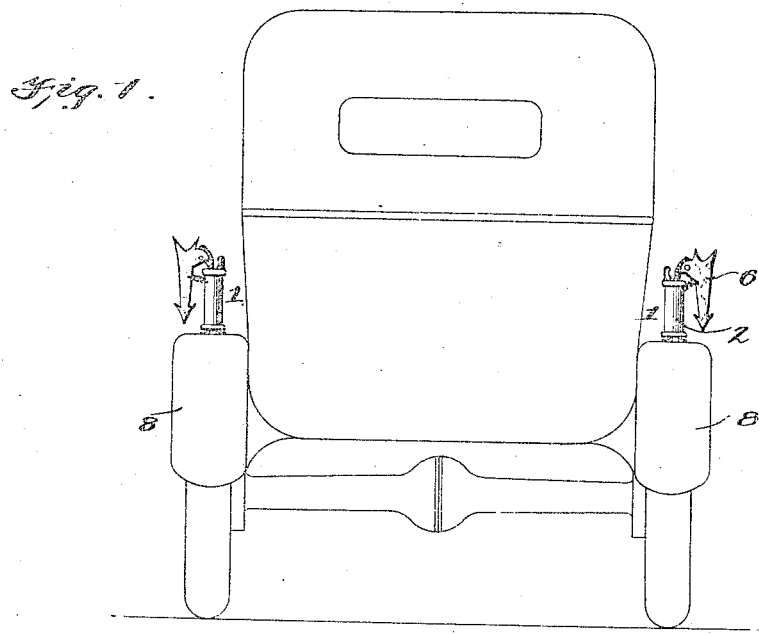
Figure 2:
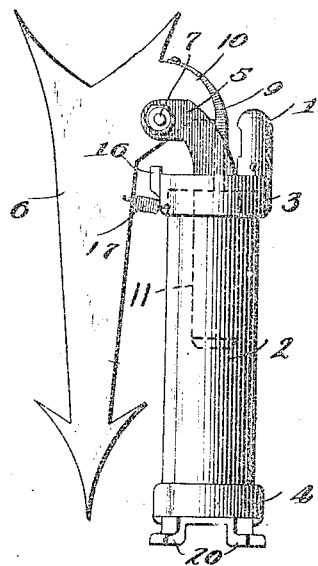
Figure 4:
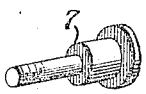
Figure 3:
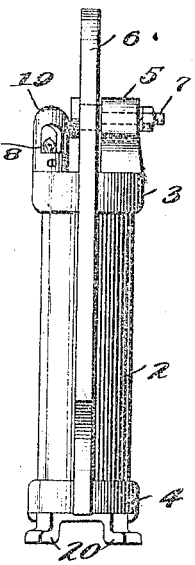

Figure 1 is a rear elevation of an automobile illustrating a pair of the solenoidal signals installed on the rear fenders directly above the rear wheels, Figure 2 is a detail elevation of one of the signals, Figure 3 is a similar view taken from another position, Figure 4 is a detail perspective view of the pivot pin of the signal arm, Figure 5 is a detail sectional view of the barrel with the upper and lower end caps removed, and illustrating the fluted core and sleeve, Figure 6 is a detail cross section on the line 6—6 of Figure 5, Figure 7 is a detail plan view, Figure 8 is a detail perspective view of the core, and Figure 9 is a diagram of the electric circuits, also showing how the switch is mounted on the steering post of the automobile.

The general construction of the direction indicator 1 comprises a barrel 2, preferably made of brass or other non-magnetic material, threaded at each end so that the upper and lower caps 3 and 4 can be screwed into place and make moisture-tight closures. The upper cap 3 includes an arm 5 to which the signal arm 6 is pivoted at 7.

One of the direction indicators is mounted on each of the rear fenders 8 of the automobile, as illustrated in Figure 1, the indicator in each case being positioned at the center of and in a perpendicular line with the hub of the rear wheel. Since both indicators are precisely alike in construction, except that they are made right and left the following description of one will suffice for both. In each case the light and arrow must show to the rear.

A cable 9 of any suitable material, is affixed to the semi-circular back of the heel 10 of the signal arm, and extends into the barrel 2 where it is secured to the core 11 of the solenoid 12. The brass barrel 2 contains the solenoid, and the core 11 moves in the sleeve 13. Both the sleeve and core are fluted at 14 and 15 respectively, for the purpose of preventing the creation of eddy currents and the resultant heating of the parts.

An abutment 16 on the upper cap 3, limits the extending movement of the signal arm 6 by virtue of the engagement therewith by the heel 10. A spring 17, connected between the arm 6 and cap 3, assists gravity in returning the signal arm to the normally depressed position and the solenoid 12 is de-energized. A lamp 18 located in a suitable shield 19 mounted on the upper cap 3, throws a beam of light on the signal arm when extended to the horizontal position.

The lower cap 4 has a number of feet 20 by means of which the direction indicator is mounted on the wheel guard of the automobile. In case it should be found that the curvature of the wheel guard precludes mounting the indicator in the proper position, a suitable number of washers may be interposed so as to provide a level base for the feet.

The electrical system is illustrated in Figure 9, in which the switch block 21 is shown to be mounted on the steering post 22 by means of a clamp 23 or other suitable means. A wire 24 leads from the positive pole of the battery B to one terminal of the button 25, the other terminal of which being connected by a wire 26 to one end of the solenoid 12.

A branch wire 27 leads to the buttons 28 and 29, the respective buttons taken in the order of description, being indicated "R", "L/R" and "L". A wire 30 leads from the other terminal of the button 29 to the solenoid 12 of the left hand indicator, a common wire 31 joining both solenoids with the negative pole of the battery.

Wires 32 and 33 join separate terminals of the central button 28 with the wires 26 and 30. The lamps 18 are connected in parallel across the respective wires 26, 31 and 30, 31.

In operation, assuming that the driver of the automobile proposes to turn toward the right, he reaches down to the button 25 on the steering post, and upon depression thereof, causes current to flow from the positive pole of the battery B, over wire 24, across the contacts of the button to wire 26, through the solenoid to the ground wire 31 and then back to the negative pole of the battery. A portion of the current also flows through the light 18 illuminating the signal arm 6 when it is moved to the horizontal indicating position by the energization of the solenoid and consequent attraction of the core 11. The signal arm is made preferably of brass or some other non-magnetic material which will not be influenced by the magnetic field of the solenoid. In order to render the arm more clearly visible at night, it is nickel-plated, so that when the rays of light from the lamp 18 fall on it, it will stand out more prominently against the dark.

Should the operator desire to indicate to the vehicles behind it that he intends to turn toward the left, he presses the button 29, whereupon current will flow over the circuit which the reader can easily trace in Figure 9. If the driver intended to stop, he depresses the central button 28 which will simultaneously energize both solenoids, causing both signal arms 6 to fly out to the horizontal position and thus indicate that the automobile will come to a stop.

The advantages may be briefly stated. The customary practice among drivers of all kinds of motor vehicles is to throw out the arm to indicate to those behind them whether they intend to turn or not. As a matter of convenience, it is far easier to simply reach down on the steering post to depress one or the other of the two buttons so as to actuate one or the other of the solenoids and thus throw out the signal arm and indicate to those following, which direction the driver intends to take.

There is an added advantage in having one of the signal devices on each side of the automobile. In cases where the driver relies on simply throwing out his arm to indicate the direction he intends to take, there is the restriction that only the left arm can be employed, and in case it is desired to indicate that a turn toward the right is to be taken, the driver must reach over relatively far so as to throw out his right arm. Obviously the direction indicator may be used both in day or night service.

According to present practice there is no way of indicating a driver's intention to stop all together. The direction indicator herein disclosed makes it easy to indicate this intention by simply depressing the central button, which will cause the throwing out of both signal arms, which in the present instance, are made in the shape of arrows. While the spring 17 is a simple provision, it really performs several distinct and important functions. It holds the signal arm 6 down and thus keeps it from rattling by pulling the core 11 up against the top of the cap 3. The core is therefore also held tightly in the barrel and prevented from rattling. The spring assists gravity in quickly moving the signal arm to the normal depressed position when the solenoid is de-energized.

While the construction and arrangement of the improved direction indicator, as herein described and claimed, is that of a generally preferred form, obviously modifications and changes may be made without departing from the spirit of the invention or the scope of the claims.

I claim:—

1. A direction indicator, comprising a barrel with suitably attached upper and lower caps, the latter having means enabling mounting of the indicator, the former having a bracket and lug; a signal arm pivoted on the bracket, with a connection to a core of a solenoid in the barrel, and including a heel to engage the lug when the arm is moved to the extended position; and a spring attached to the arm assisting its gravitation to the depressed position upon deenergization of the solenoid, and to keep the core in contact with the upper cap to prevent rattling of the parts.

2. A direction indicator comprising a barrel, a solenoid disposed within the barrel and being provided with a movable core, a cap threadedly engaging the barrel at one end, an arm outstanding from the cap, a signal arm pivotally supported upon the first named arm to lie close to the barrel and substantially parallel therewith when in idle position, said signal arm having a heel portion extending in position to move between the axis of the pivot thereof and the cap when the signal arm is moved from idle position toward right angular position in respect to the barrel, an abutment carried by said cap in position to be engaged by the heel portion of the signal arm when the latter has been moved into right angular position in respect to the barrel, whereby the movement of the signal arm about the axis of its pivot is limited, a connection between the heel portion of the signal arm and the core of the solenoid, whereby the signal arm will be moved from idle position by operation of the solenoid, and a retractile spring arranged between the cap and the signal arm for returning and yieldingly maintaining the latter in idle position.

3. A day and night direction indicator comprising a casing consisting of a barrel open at one end and a cap normally closing the open end of the barrel, a solenoid disposed within the barrel and including a stationary fluted sleeve and a fluted core mounted for reciprocation in the sleeve, a signal arm pivotally supported upon the cap to lie close to the barrel and substantially parallel therewith when in idle position, a shield mounted on the cap having an opening directed toward the signal arm, a lamp in said shield, spring means connecting the cap and the signal arm for yieldingly maintaining the latter in idle position, a connection between the signal arm and the core of the solenoid for actuating the signal arm to swing the latter about its pivot away from the barrel when the core of the solenoid is moved in one direction, and an abutment carried by the cap for engaging the signal arm to prevent progressive movement thereof when the signal arm has been moved substantially at right angles to the barrel.

4. A direction indicator comprising a barrel having a top, a signal arm, means on the top by which the signal arm is pivoted in an exposed position, means arranged between the signal arm and barrel to normally hold the arm in a depressed position, a connection extending from a part of the arm inside of the barrel, a solenoid inside of the barrel, and a core in the solenoid to which said connection is joined, said core being held against the top to limit the movement of the arm to the depressed position.

5. A direction indicator comprising a signal arm, a casing, a solenoid in the casing including a core, a connection between the core and signal arm, means carried by the top of the casing providing a bearing support for the signal arm, and means in connection with the arm assisting it to gravitate to a depressed position when the solenoid is deenergized, the core being held against the top of the casing to limit the movement of the arm and prevent the parts from rattling.

FRANK OLIVER GRAY.